United States Patent [19]

Nedzu

[11] Patent Number: 5,096,653

[45] Date of Patent: Mar. 17, 1992

[54] PROCESS OF PRODUCING TRANSPARENT PBT/POLYCARBONATE FILM

[75] Inventor: Shigeru Nedzu, Shizuoka, Japan

[73] Assignee: Polyplastics Co., Ltd., Osaka, Japan

[21] Appl. No.: 583,049

[22] Filed: Sep. 14, 1990

[30] Foreign Application Priority Data

Sep. 14, 1989 [JP] Japan .................. 1-239613

[51] Int. Cl.$^5$ .................. B29C 47/20; B29C 55/28
[52] U.S. Cl. .................. 264/564; 264/211.12
[58] Field of Search .................. 264/209.5, 210.1, 211.12, 264/564

[56] References Cited

U.S. PATENT DOCUMENTS 4,869,864  9/1989  Taniguchi ................... 264/564

FOREIGN PATENT DOCUMENTS 44-21676  9/1969  Japan ................... 264/564

Primary Examiner—Leo B. Tentoni
Attorney, Agent, or Firm—Nixon & Vanderhye

[57] ABSTRACT

A process of producing a transparent resin film includes inflation molding in an upward direction a resin composition which having 100 parts by weight of a polybutylene terephthalate resin having an intrinsic viscosity $IV_a$ of at least 1.0, and between 15 to 45 parts by weight of a polycarbonate resin having an intrinsic viscosity $IV_b$ of at least 0.4. The polybutylene terephthalate and polycarbonate resins are present such that the ratio $\eta_A/\eta_B$ is between 0.35 to 1.5, wherein $\eta_A$ is the melt viscosity of the polybutylene terephthalate resin at a shear rate of $100^{-1}$ at 260° C., and $\eta_B$ is the melt viscosity of the polycarbonate resin at a shear rate of $100^{-1}$ at 260° C. During inflation molding, the resin composition is extruded at an extrusion temperature T(°C.) which satisfies the equation:

$$240°\,C. \leq T(°C.) \leq (MP-26)+(53 \times IV_a)$$

where MP is the melting point of the resin composition as determined by differential thermal analysis at a rate of 10° C. per minute. The films will exhibit a low haze value of less than 10% as determined by ASTM D 1003.

3 Claims, No Drawings

PROCESS OF PRODUCING TRANSPARENT PBT/POLYCARBONATE FILM

FIELD OF THE INVENTION

The present invention relates to transparent polybutylene terephthalate resin film and to processes for producing the same. In particular, the present invention relates to a transparent polybutylene terephthalate resin film that may be produced using conventional air-cooled upward inflation molding techniques. The resulting film will possess transparency and excellent thermal resistance when produced by the process of the present invention.

BACKGROUND AND SUMMARY OF THE INVENTION

Polybutylene terephthalate (PBT) resin is widely used as a conventional engineering plastic. Although PBT resin is usually employed to form injection-molded articles, it is also sometimes extrusion-molded to form films, for example.

It is well known that resin films may be produced by either a T-die method or an inflation molding method. In this regard, it was typically thought to be difficult to produce polybutylene terephthalate resin films by an inflation molding method. It has recently been proposed to form films having excellent properties which can be produced by inflation-molding processes. In this regard, please see Japanese Patent Laid-Open No. 63-251,219 and U.S. Pat. No. 4,869,864 (incorporated hereinto by reference).

Films are used in a number of end-use applications. For example, highly transparent films, in particular, transparent polybutylene terephthalate resin films, having excellent thermal and chemical resistance are needed in the packaging field, especially for food packaging. However, highly transparent films can usually not be obtained under any molding conditions by means of conventional upward inflation molding methods using air-cooling apparatus. That is, transparent films cannot be obtained using ordinary air-cooling upward inflation molding techniques since the films tend to cloud due to crystallization of PBT resin—i.e., because polybutylene terephthalate resin has a high crystallization rate.

The present invention is directed to films that are highly transparent and exhibit excellent thermal and chemical resistance properties that can be produced via inflation-molding conditions using a resin composition which includes a polybutylene terephthalate resin component having a particular intrinsic viscosity, and a polycarbonate resin component having a particular intrinsic viscosity incorporated into the composition in a particular amount.

The term "transparent" as used herein and in the accompanying claims is intended to refer to a haze value (cloudiness value) of the film of less than 10% as determined according to ASTM D 1003.

More specifically, the films of this invention will be formed by an upward inflation molding technique using a resin composition which is comprised of 100 parts by weight of a polybutylene terephthalate resin having an intrinsic viscosity $IV_a$ (as determined in o-chlorophenol at 25° C.) of at least 1.0, and between 15 to 45 parts by weight of a polycarbonate resin having an intrinsic viscosity $IV_b$ (determined in methylene chloride at 20° C.) of at least 0.4. The polybutylene terephthalate resin component and the polycarbonate resin component are present such that the ratio $\eta_A/\eta_B$ is between 0.35 to 1.5, wherein $\eta_A$ is the melt viscosity of the polybutylene terephthalate resin at a shear rate of $100\text{sec}^{-1}$ at 260° C., and $\eta_B$ is the melt viscosity of the polycarbonate resin at a shear rate of $100\text{sec}^{-1}$ at 260° C.

The resin composition is most preferably extruded at an extrusion temperature T(° C.) during the inflation molding step so as to satisfy the equation (1):

$$240°\text{ C.} \leq T(°\text{C.}) \leq (MP-26)+(53 \times IV_a)$$

where MP is the melting point of the resin composition as determined by differential thermal analysis at a rate of 10° C. per minute. The inflation molding step itself generally includes extruding the resin composition continually through an annular die in an upward direction so as to form a tubular film of the extruded resin, and introducing cooling air into said tubular film so as to achieve an inflation ratio $D_1/D_2$ of between 1.0 to 3.0, where $D_1$ is the diameter of the tubular film exiting the extrusion die, and $D_2$ is the maximum diameter of the tubular downstream of the extrusion die. The thickness of the film is advantageously 50 μm or less.

Further aspects of the present invention will become more clear after careful consideration is given to the following detailed description of the preferred embodiments thereon.

DETAILED DESCRIPTION OF THE PREFERRED EMBODIMENTS

The polybutylene terephthalate resin component that may be used in the present invention includes polyester resins whose main recurring units are butylene terephthalate units. In particular, polyester resins produced by polycondensing 1,4-butanediol with terephthalic acid or its lower alcohol ester are especially preferred. The polybutylene terephthalate resin may also be a copolymer mainly comprised of polybutylene terephthalate.

When the intrinsic viscosity of the polybutylene terephthalate resin is less than 1.0, film formation becomes difficult due to excessive drawdown during the inflation molding step. A mixture of a polybutylene terephthalate resin having an intrinsic viscosity of less than 1.0 with a polybutylene terephthalate resin having an intrinsic viscosity of 1.0 or above is capable of forming a film and is usable as the base resin of the present invention provided that the intrinsic viscosity of the resin mixture is at least 1.0. Although the upper limit of the intrinsic viscosity of the polybutylene terephthalate resin is not particularly limited, excessively high intrinsic viscosity makes film production more difficult, and thus the upper limit of intrinsic viscosity is selected on the basis of practical considerations. The intrinsic viscosity of the polybutylene terephthalate resin is thus preferably between 1.0 to 2.0, and preferably between 1.2 to 1 8.

The polycarbonate resin used herein can be produced by the solvent synthesis method wherein either a dihydric phenol is reacted with a carbonate precursor, such as phosgene, or a dihydric phenol is transesterified with a carbonate precursor, such as diphenyl carbonate, in the presence of known acid acceptor and molecular weight modifier in a solvent, such as methylene chloride.

The preferred dihydric phenols include bisphenols, among which 2,2-bis(4-hydroxyphenyl)propane, i.e.

bisphenol A, is particularly preferred. Bisphenol A can be partially or wholly replaced with another dihydric phenol. The dihydric phenols other than bisphenol A include hydroquinone, 4,4-dihydroxydiphenyl, bis(4-hydroxyphenyl) alkanes, bis(4-hydroxyphenyl) cycloalkanes, bis(4-hydroxyphenyl) sulfide, bis(4-hydroxyphenyl) sulfone, bis(4-hydroxyphenyl) sulfoxide, bis(4-hydroxyphenyl) ethers and halogenated bisphenols such as bis(3,5-dibromo-4-hydroxyphenyl) propane and bis(3,5-dichloro-4-hydroxyphenyl) propane. The dihydric phenol may be a homopolymer thereof or a copolymer of two or more of them. The polycarbonate resin used in the present invention may also be a randomly branched thermoplastic polycarbonate produced by reacting a polyfunctional aromatic compound with a dihydric phenol and/or a carbonate precursor.

When the intrinsic viscosity of the polycarbonate resin is below 0.4, the formed film will have low tensile strength and unfavorable tensile elongation properties. Although the upper limit of the intrinsic viscosity of the polycarbonate resin is not particularly limited, an excessively high intrinsic viscosity is not preferred since (1) the film production becomes more difficult, (2) the dispersion with the polybutylene terephthalate resin is insufficient, and (3) the transparency of the film is reduced. The intrinsic viscosity of the polycarbonate resin used is thus selected based on the above-noted considerations.

The amount of the polycarbonate resin used is preferably between 15 to 45 parts by weight per 100 parts by weight of the polybutylene terephthalate resin. When the amount of the polycarbonate resin is less than 15 parts by weight, the transparency of the formed film is unfavorably low. When it exceeds 45 parts by weight, on the other hand, the take-up of the film becomes difficult due to its excessive high blocking characteristics. In addition, the formed film has poor thermal resistance properties.

The polybutylene terephthalate resin can be blended with the polycarbonate resin by any conventional method. For example, the polycarbonate resin may be added when the polymerization of the polybutylene terephthalate resin is near completion. Alternatively, the polybutylene terephthalate resin may be melt-blended with the polycarbonate resin using a conventional extruder. Melt blending may also occur during extrusion in the inflation molding step. If melt-blended, the melt-blending time is preferably less than 30 min, particularly less than 10 min, in order to inhibit the copolymerization or discoloration of the resin composition.

The ratio $\eta_A/\eta_B$ of the intrinsic viscosity of the polybutylene terephthalate resin to the intrinsic viscosity of the polycarbonate resin must be in the range between 0.35 to 1.5, and is preferably between 0.5 to 1.2

When the viscosity ratio ($\eta_A/\eta_B$) is less than 0.35 or greater than 1.5, the dispersion compatibility of the resins during melt blending is poor thereby deleteriously affecting the transparency of the film. Thus, in order to obtain a film having excellent transparency, the ratio $\eta_A/\eta_B$ must be in the range of between 0.35 to 1.5, and particularly between 0.5 to 1.2.

The film-forming conditions are also important in order to achieve highly transparent film. In this regard, the extrusion temperature T(° C.) of the resin composition in the inflection step must be in the range as defined by the above equation (1). The extrusion temperature T(°C.) of the resin composition is preferably between 240° to 280° C., particularly preferably between 250° to 270° C. When the extrusion temperature of the resin composition is less than 240° C., the resulting film has a low transparency. On the other hand, when it exceeds 280° C., the melt viscosity is lowered which increases the film drawdown and thereby seriously impairs the molding properties.

In the film-molding step, the inflation ratio —i.e. the ratio of the final (maximum) diameter $D_2$ of the inflated tubular film to the diameter $D_1$ of the extrusion die— must be in the range of between 1.0 to 3.0. The film thickness is preferably 50 μm or less, since film thicknesses in excess of 50 μm make production of the transparent film difficult.

The composition of the present invention may contain known substances added to ordinary thermoplastic and thermosetting resins, such as plasticizers, stabilizers, e.g. antioxidants and ultraviolet absorbers, lubricants, antistatic agents and surfactants depending on the properties required of the product provided that the resulting film transparency is not impaired. Other thermoplastic resins and inorganic fillers may also be incorporated into the composition, again provided that the effect of the present invention is not inhibited.

The films of the present invention thus produced can be used as packaging material for foods and various other substances, since it has excellent transparency and thermal, chemical and oil resistance characteristics and is both tasteless and odorless. In addition, the films of this invention have excellent slip properties so as to provide advantages in automated bag production, printing and lamination. Thus, the films of the present invention may be used in a variety of packaging systems and/or environments.

EXAMPLES

The following nonlimiting Examples will further illustrate the present invention.

The transparency of the films was represented in terms of a haze value as determined according to ASTM D 1003 on the basis of the following criteria:
ⓞ: excellent (haze: 5% or below)
◯: good (haze: 5 to 10%)
Δ: poor (haze: 10 to 20%)
X: unacceptable (haze: 20% or above)

EXAMPLES 1 to 3

A resin composition comprising a polybutylene terephthalate resin (PBT) having an intrinsic viscosity of 1.4 and polycarbonate resin (PC) having an intrinsic viscosity of 0.51 (viscosity ratio $\eta_A/\eta_B$: 0.54) and having a ratio of PBT to PC of 85:15, 80:20 or 70:30 was melt-kneaded with a 40mmφ twin-screw extruder to prepare resin pellets. The pellets were molded into a tubular film having a thickness of 25 μm at an extruded resin temperature specified in Table 1 at an inflation ratio of 2.0 with an air-cooled upward inflation molding machine to determine the moldability and transparency of the film. The results are given in Table 1.

EXAMPLES 4 to 7

A PBT resin having an intrinsic viscosity of 1.4 or 1.2 was melt-mixed with a PC resin having an intrinsic viscosity of 0.4, 0.51 or 0.57 in a ratio specified in Table 1 with a 40 mmφ twin-screw extruder to prepare resin pellets. The pellets were molded into a film at an extruded resin temperature specified in Table 1 in the same manner as that of Examples 1 to 3. The obtained films were examined in the same manner as that of Examples 1 to 3. The results are given in Table 1.

COMPARATIVE EXAMPLES 1 to 5

A PBT resin having an intrinsic viscosity of 1.4 or 1.2 was melt-mixed with a PC resin having an intrinsic viscosity of 0.51, 0.55 or 0.60 in a ratio specified in Table 1 with a 40 mm$\phi$ twin-screw extruder to prepare resin pellets. The pellets were molded into a film at an extruded resin temperature specified in Table 1 in the same manner as that of Examples 1 to 3. The formed films were examined in the same manner as that of Examples 1 to 3. The results are given in Table 1.

EXAMPLES 6 and 7

A PBT resin having an intrinsic viscosity of 1.4 was melt-mixed with a PC resin having an intrinsic viscosity of 0.40 in a ratio specified in Table 1 with a 40 mm$\phi$ twin-screw extruder to prepare resin pellets. The pellets were molded into a film at an extruded resin temperature specified in Table 1 in the same manner as that of Examples 1 to 3. The results are given in Table 1.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

weight of a polycarbonate resin having an intrinsic viscosity $IV_b$ of at least 0.4 such that the ratio $\eta_A/\eta_B$ is between 0.35 to 1.5, wherein $\eta_A$ is the melt viscosity of the polybutylene terephthalate resin at a shear rate of 100 sec$^{-1}$ at 260° C., and $\eta_B$ is the melt viscosity of the polycarbonate resin at a shear rate of 100 sec$^{-1}$ at 260° C. to form a resin composition which consists essentially of said polybutylene terephthalate and polycarbonate resins, and forming a film of the resin composition having a haze value of less than 10% as determined by ASTM D 1003 by inflation molding the resin composition in an upward direction, and wherein said step of forming the film by inflation molding includes extruding the resin composition through an extrusion die at an extrusion temperature T(°C.) which satisfies the equation:

$$240° C. \leq T(°C.) \leq (MP-26)+(53 \times IV_a)$$

where MP is the melting point of the resin composition as determined by differential thermal analysis at a rate of 10° C. per minute, and T(°C.) and $IV_a$ are as defined previously.

2. A process as in claim 1, wherein said inflation molding step includes extruding the resin composition continually through an annular die in an upward direction so as to form a tubular film of the extruded resin, and introducing cooling air into said tubular film so as to achieve an inflation ratio $D_1/D_2$ of between 1.0 to 3.0, where $D_1$ is the diameter of the tubular film exiting the extrusion die, and $D_2$ is the maximum diameter of the tubular downstream of the extrusion die.

3. A process as in claim 1, wherein the film has a thickness of 50 μm or less.

TABLE 1

|  |  | PBT resin | | PC resin | | Melting point (°C.) | $n_A/n_B$ | Temp. of extruded resin (°C.) | Film-forming properties | Transparency |
|---|---|---|---|---|---|---|---|---|---|---|
|  |  | intrinsic viscosity (IV) | mixing ratio (wt. %) | intrinsic viscosity (IV) | mixing ratio (wt. %) |  |  |  |  |  |
| Example | 1 | 1.4 | 85 | 0.51 | 15 | 223 | 0.54 | 260 | good | ○ |
|  | 2 | " | 80 | " | 20 | " | " | 250 | " | ○ |
|  | 3 | " | 70 | " | 30 | " | " | 250 | " | ○ |
|  | 4 | " | 80 | 0.40 | 20 | " | 1.15 | 270 | " | ◉ |
|  | 5 | " | 80 | 0.57 | 20 | " | 0.37 | 260 | " | ○ |
|  | 6 | 1.2 | 80 | 0.40 | 20 | 224 | 0.80 | 260 | " | ◉ |
|  | 7 | " | 80 | 0.51 | 20 | " | 0.38 | 240 | " | ○ |
| Comp. Ex. | 1 | 1.4 | 100 | — | — | 224 | — | 260 | good | x |
|  | 2 | " | 90 | 0.51 | 10 | 223 | 0.54 | 260 | " | x |
|  | 3 | " | 85 | 0.60 | 15 | " | 0.33 | 260 | " | Δ |
|  | 4 | " | 80 | " | 20 | " | " | 250 | " | Δ |
|  | 5 | 1.2 | 80 | 0.55 | 20 | 224 | 0.29 | 250 | " | Δ |
|  | 6 | 1.4 | 80 | 0.40 | 20 | 223 | 1.15 | 235 | " | Δ |
|  | 7 | " | 80 | 0.40 | 20 | " | 1.15 | 290 | unmoldable | — |

What is claimed is:

1. A process of producing a transparent resin film comprising the steps of:

melt-blending 100 parts by weight of a polybutylene terephthalate resin having an intrinsic viscosity $IV_a$ of at least 1.0, and between 15 to 45 parts by

* * * * *

UNITED STATES PATENT AND TRADEMARK OFFICE
CERTIFICATE OF CORRECTION

PATENT NO. : 5,096,653
DATED     : March 17, 1992
INVENTOR(S) : Shigeru NEDZU

It is certified that error appears in the above-identified patent and that said Letters Patent is hereby corrected as shown below:

On the Title page:

Under ABSTRACT, line 11, delete "$100^{-1}$" and insert --$100\ sec^{-1}$--;
line 12, delete "$100^{-1}$" and insert --$100\ sec^{-1}$--.

Column 2, line 24, after "tubular" insert --film--;
line 28, delete "thereon" and insert --thereof--.

Column 3, line 66, after "the" delete "inflection" and insert --inflation--.

Column 6, line 5, after "100" delete "$sec^{213}$" and insert --$sec^{-1}$--;
line 51, after "tubular" insert --film--.

Signed and Sealed this

Eighth Day of June, 1993

Attest:

MICHAEL K. KIRK

*Attesting Officer*   Acting Commissioner of Patents and Trademarks